(12) United States Patent
Olson et al.

(10) Patent No.: US 7,561,567 B1
(45) Date of Patent: Jul. 14, 2009

(54) PROTOCOL TO IMPLEMENT TOKEN ID MECHANISM FOR NETWORK DATA TRANSFER

(75) Inventors: Dave Olson, Palo Alto, CA (US); Gregory B. Lindahl, Mountain View, CA (US); Jeffrey B. Rubin, Pleasanton, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 728 days.

(21) Appl. No.: 11/137,925

(22) Filed: May 25, 2005

Related U.S. Application Data

(60) Provisional application No. 60/574,402, filed on May 25, 2004, provisional application No. 60/599,565, filed on Aug. 5, 2004, provisional application No. 60/599,605, filed on Aug. 5, 2004.

(51) Int. Cl.
*H04L 12/28* (2006.01)
(52) U.S. Cl. ..................................... 370/389
(58) Field of Classification Search ................. 370/412, 370/389, 392
See application file for complete search history.

(56) References Cited

U.S. PATENT DOCUMENTS

| | | | | |
|---|---|---|---|---|
| 5,410,326 | A * | 4/1995 | Goldstein | 348/734 |
| 5,898,688 | A * | 4/1999 | Norton et al. | 370/362 |
| 6,314,477 | B1 * | 11/2001 | Cowger et al. | 710/22 |
| 6,498,793 | B1 * | 12/2002 | Haviland | 370/394 |
| 6,615,383 | B1 * | 9/2003 | Talluri et al. | 714/749 |
| 7,058,751 | B2 * | 6/2006 | Kawarai et al. | 710/317 |
| 7,110,363 | B1 * | 9/2006 | Lawrence et al. | 370/236.1 |
| 7,120,728 | B2 | 10/2006 | Krakirian et al. | |
| 2003/0133453 | A1 | 7/2003 | Makishima et al. | |
| 2003/0223433 | A1 | 12/2003 | Lee et al. | |
| 2004/0052259 | A1 * | 3/2004 | Garcia et al. | 370/392 |
| 2004/0062267 | A1 * | 4/2004 | Minami et al. | 370/463 |
| 2005/0060443 | A1 * | 3/2005 | Rosner | 710/33 |
| 2005/0111465 | A1 | 5/2005 | Stewart | |
| 2005/0144310 | A1 * | 6/2005 | Biran et al. | 709/234 |
| 2005/0188209 | A1 | 8/2005 | Chen et al. | |
| 2006/0146715 | A1 | 7/2006 | Supalov | |
| 2007/0011560 | A1 * | 1/2007 | Backman et al. | 714/758 |

OTHER PUBLICATIONS

U.S. Appl. No. 11/137,920 to Olson et al.*
"Office Action from USPTO dated Mar. 25, 2008 for U.S. Appl. No. 11/137,920".
"Infiniband Architecture Specification vol. 1, Release 1.0.a", Infiniband Trade Association,(Jun. 19, 2001),124-140.
"Office Action from USPTO dated May 13, 2008 for U.S. Appl. No. 11/137,980".

(Continued)

*Primary Examiner*—Derrick W Ferris
*Assistant Examiner*—Omar Ghowrwal
(74) *Attorney, Agent, or Firm*—Klein, O'Neill & Singh, LLP

(57) ABSTRACT

A receiving node sends a token identifier to the data source and receives data from the data source, along with the token identifier. A token identifier identifies a location in memory on the receiving node, but is not the same as an address in the memory. In the described embodiments, a token identifier is an integer value that acts as an index into a token array, which identifies the memory location.

24 Claims, 14 Drawing Sheets

OTHER PUBLICATIONS

"Final Office Action from USPTO dated Oct. 27, 2008 for U.S. Appl. No. 10/940,355".

"Final Office Action from USPTO dated Nov. 24, 2008 for U.S. Appl. No. 11/137,980".

* cited by examiner

Protocol Header, From Sending Node

Protocol Header, To Sending Node

Data Receive

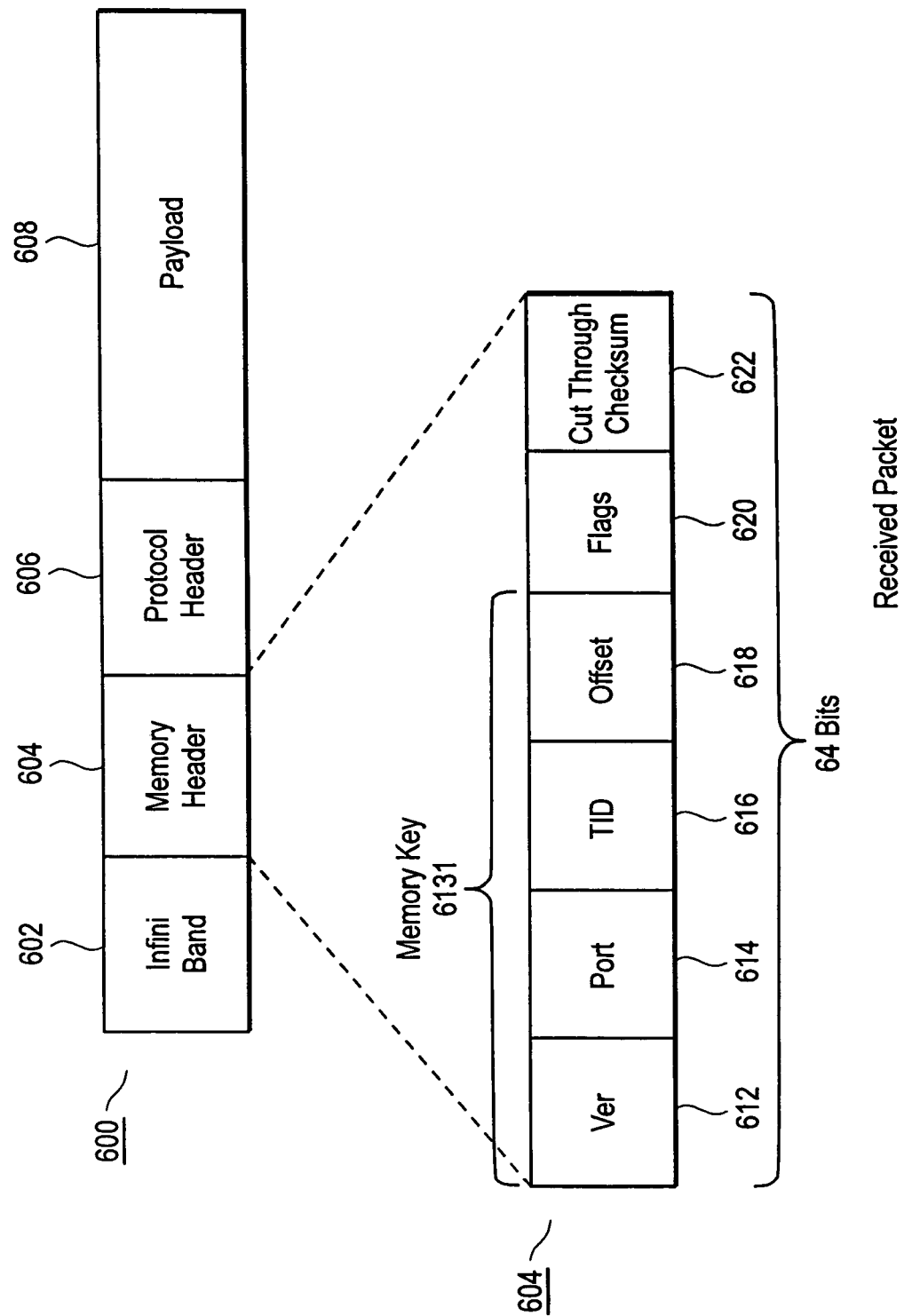

Eager TID Array On Interface

PROTOCOL TO IMPLEMENT TOKEN ID MECHANISM FOR NETWORK DATA TRANSFER

RELATED APPLICATIONS

This application claims priority under 35 U.S.C. § 119(e) from U.S. Provisional patent application Ser. No. 60/574,402, filed May 25, 2004, from U.S. Provisional patent application Ser. No. 60/599,565, filed Aug. 5, 2004, and from U.S. Provisional patent application Ser. No. 60/599,605, filed Aug. 5, 2004. The entirety of each of these provisional patent applications is incorporated herein by reference.

TECHNICAL FIELD

The present invention relates to data networking and specifically to a protocol for receiving data via a high speed network interface.

BACKGROUND

It is desirable to transfer data over a network in a fast and secure manner. In conventional network data transfer systems, an interface for one or more host computers may communicate over a variety of networks, such as a SCSI or Fibre-Channel network. In conventional systems, a data request is made and data is sent from a data source to the host's interface. Generally, the interface must wait to receive all data before the data can be processed and the checksum computed. This requirement slows the processing of data.

Ideally, data should be received and passed to the application programs with as little copying as possible since each copy operation has an adverse effect on latency. This concept is known as "zero copy." In addition, it is desirable to include a checksum in data packets to ensure that the packet has not become corrupted in some way. Many conventional packet protocols include a checksum that includes the transmitted data

SUMMARY OF INVENTION

A preferred embodiment of the present invention includes a node in a network that receives data from a data source, such as another node. The receiving node sends a token identifier to the data source and receives data from the data source, along with the token identifier. A token identifier identifies a location in memory on the receiving node, but is not the same as an address in the memory. Thus, a token identifier is preferably neither a physical memory address nor a virtual address. In described embodiments, a token identifier is an integer value that acts as an index into a token array (or table), which identifies the memory location. Alternately, a token identifier can be an ASCII string or other appropriate representation. Thus, the memory location at which data received by the receiving node is not exposed to the data source. This feature increases the security of data transfer. A table indexed by the token identifier could be in memory or on the receiving interface.

In addition, preferred embodiments of the invention validate various portions of the received data, including validating a cut-through checksum found in a received data packet. The cut-through checksum is based on data found in a packet header, and thus can be validated before the entire packet is received. This feature allows processing of the received data to begin before the entire packet has been received. Many embodiments will also receive a checksum that is based on the entire packet.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 6 shows an example format of a received packet including a token identifier.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Figure 1:
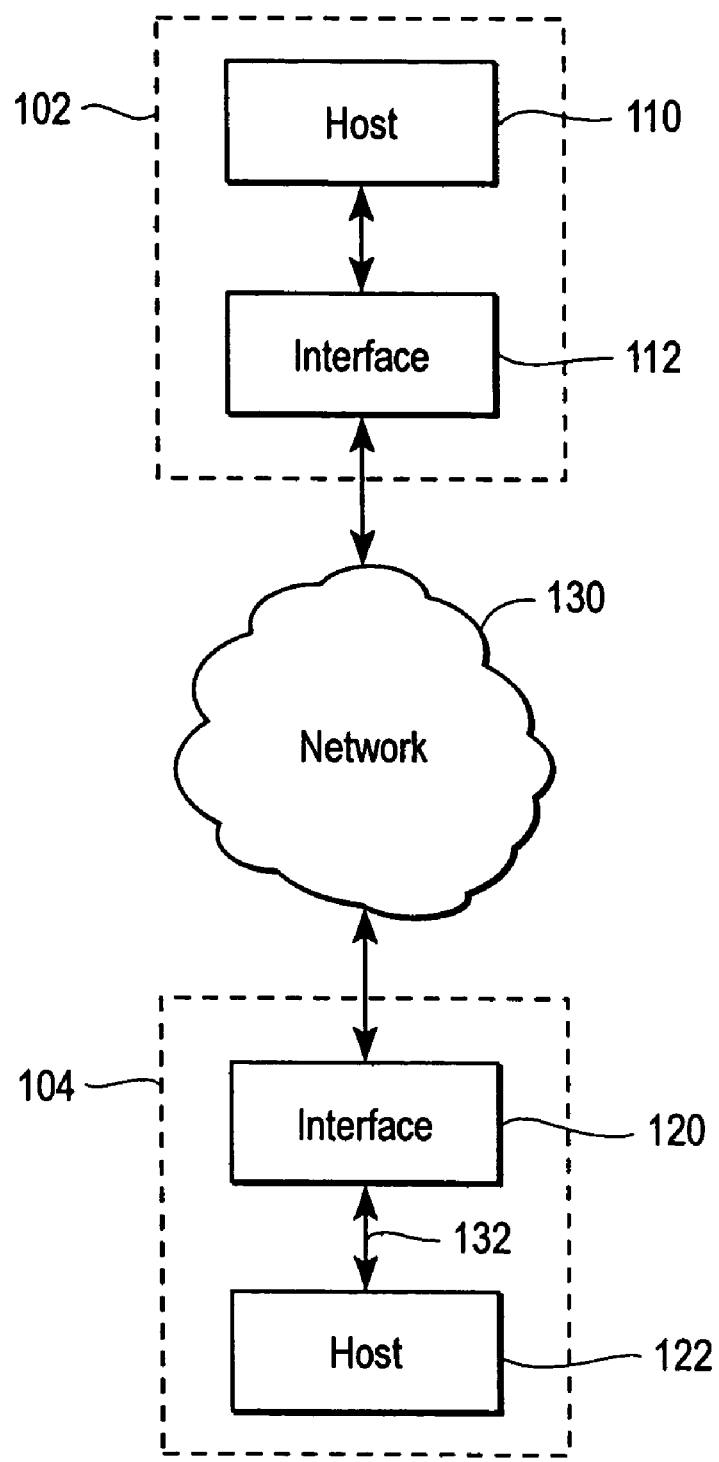
FIG. 1 is a block diagram illustrating an example of a system for practicing some embodiments of the present invention.

FIG. 1 is a block diagram illustrating an example of a system 100 for practicing some embodiments of the present invention. FIG. 1 includes a first node 102, a second node 104, and a network connecting the nodes 130. While most other systems contain more than two nodes, only two nodes are shown here for ease of explanation. In the examples that follow, node 102 acts as a receiving node and node 104 acts as a sending node. It will be understood that these roles could be reversed in other circumstances because, in a preferred embodiment, most nodes are capable of both sending and receiving data. In this embodiment, first node 102 includes a host 110 and an I/O interface 112 connected to the host 110. Nodes 102 and 104 communicate via a network 130.

Figure 2:
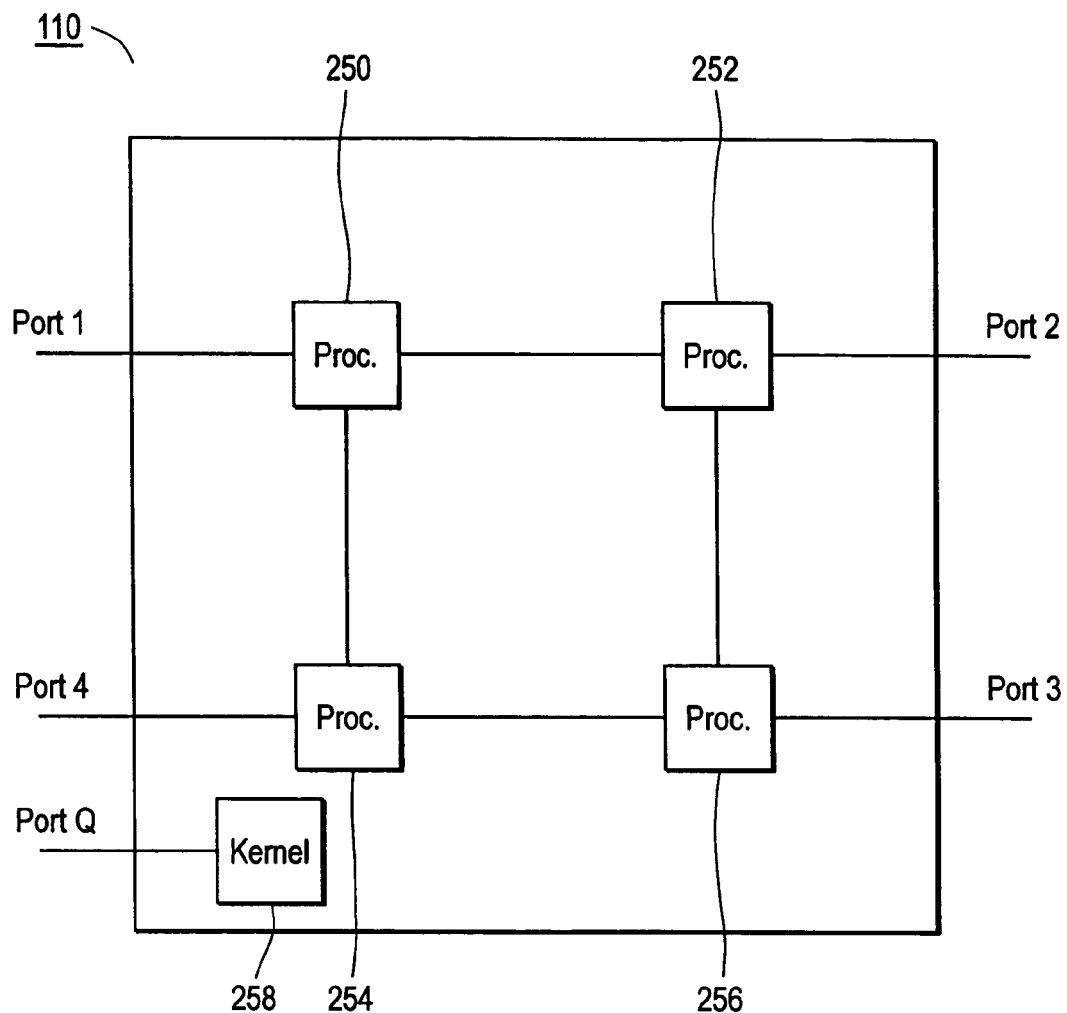
FIG. 2 shows an embodiment of a host that contains a plurality of processors and ports.

FIG. 2 shows an example of host 110, which contains a plurality of processors 250, 252, 254, 256, 258. The processors are, for example, the Opteron processor from Advanced Micro Devices, Inc. (AMD) of Sunnyvale, Calif. Each processor is associated with a port. In a preferred embodiment, Port 0 is reserved for the operating system kernel (for example, the Linux kernel, version 2.6). One or more applications execute on the processors. In the following discussion, a system and method used by one port to communicate with the interface 104 to receive data will be discussed, although it will be understood that the discussion herein may apply to any of the plurality of ports.

Figure 3A:
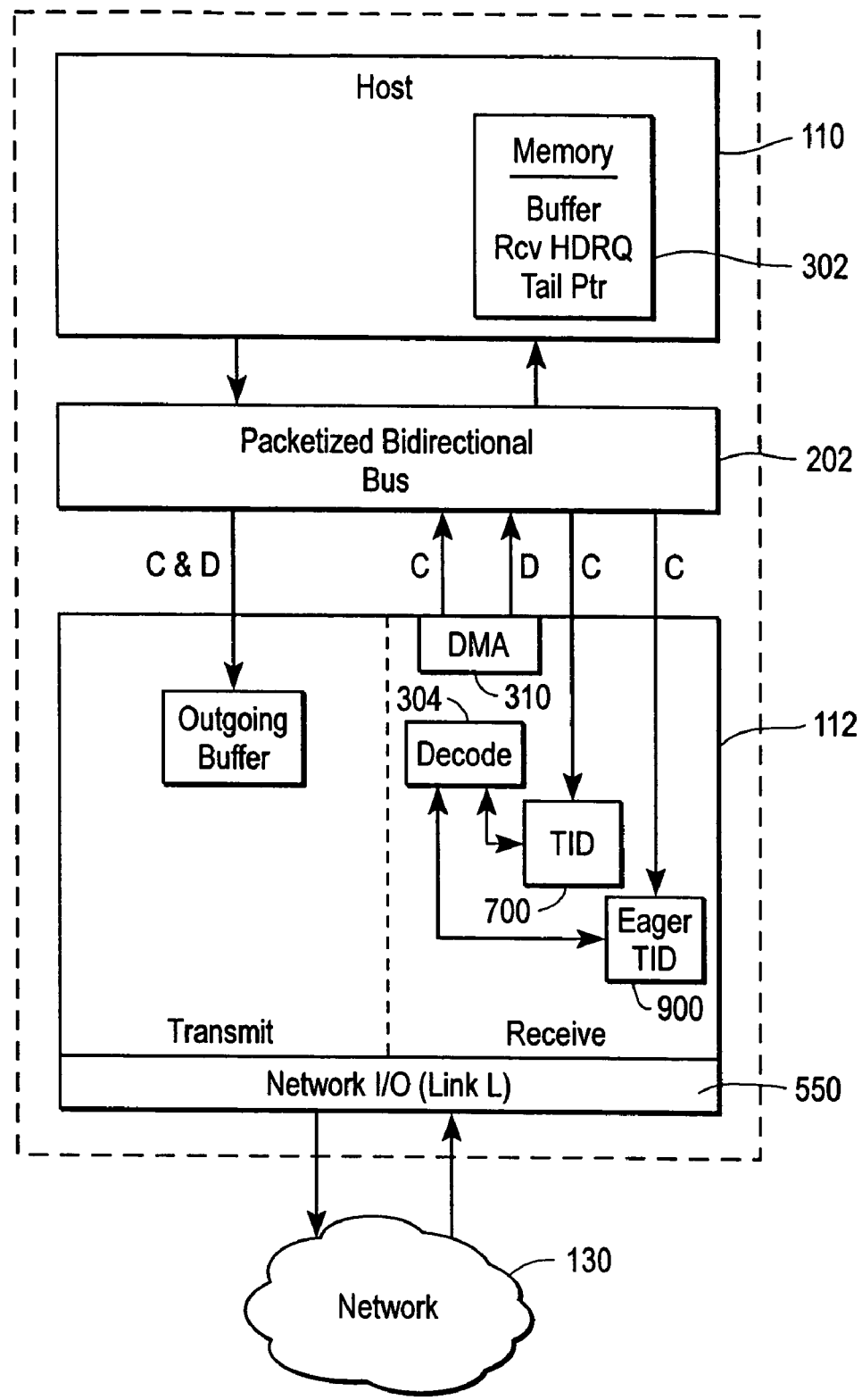
FIG. 3(a) shows a more detailed example of a node of FIG. 1.

FIG. 3(a) shows a more detailed example of FIG. 1. In FIG. 3(a), host 110 includes a memory 302. Memory 302 contains a buffer, a Receive Header Queue, and a Tail pointer for the Receive Header Queue, each of which is discussed in more detail below. The buffer contains data received via the interface 112 and transferred via Direct Memory Access (DMA) engine 310. In a preferred embodiment, host 110 communicates with interface 112 via a packetized bidirectional bus 202 using a protocol such as the HyperTransport protocol or via a non-packetized bus such as PCI Express, although any appropriate communication bus or protocol may be used. Bus 202 includes appropriate data line (D) and control lines (C). In a preferred embodiment, network 130 is an InfiniBand network.

Figure 3B:
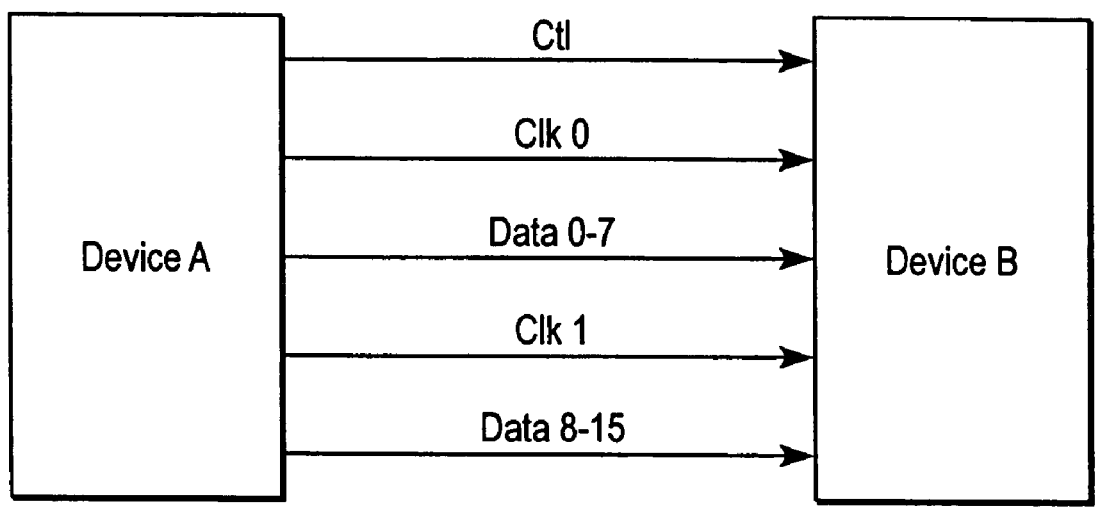
FIG. 3(b) shows details of control and data lines of FIG. 3(a).

FIG. 3(b) shows details of control and data lines of FIG. 3(a) implemented for a 16 bit HyperTransport link. Each signal shown is actually a differential pair and the group of all the signals is repeated going from B to A. The Ctl signal indicates whether the data pins are carrying a command (if Ctl is true), or data (if Ctl is false). All data signals preferably are DDR (Double Data Rate), with data on both edges, so that a single 32 bit word is transferred on a 16 bit link each clock cycle. Other currently-defined HyperTransport widths are 8, 2, 4, and 32. Other embodiments may include these widths.

Interface 112, which can be implemented as hardware (e.g., an FPGA or any type of semiconductor chip) or as software also includes decode logic 304 and a Receive Token ID (TID) Array 700 as discussed below in connection with FIG. 7. Some embodiments also include an Eager TID Array 900, as discussed below in connection with FIG. 9.

Figure 4A:
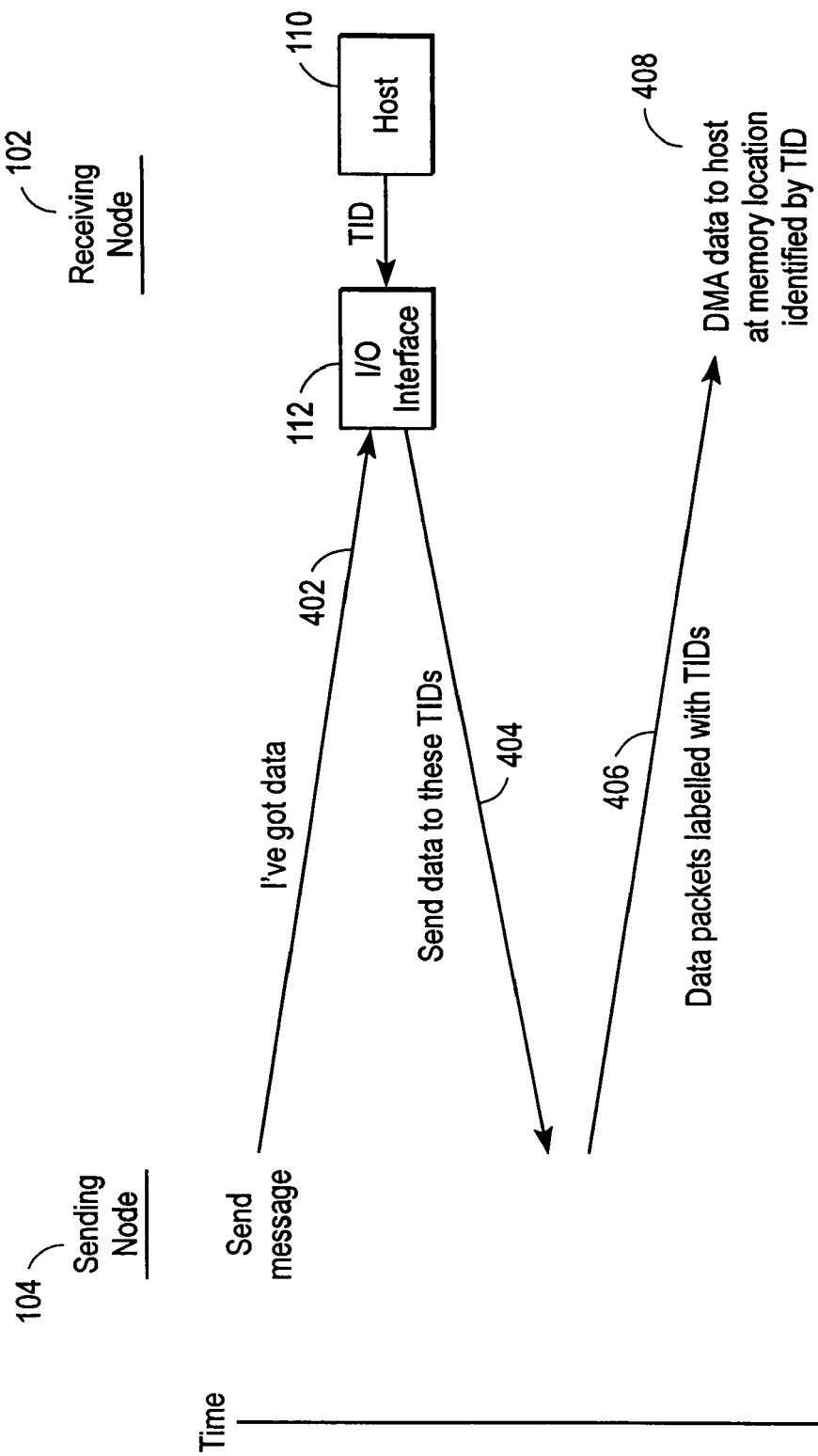
FIG. 4(a) shows an overview of data transfer between a sending node and a receiving node.

FIG. 4(a) shows an overview of data transfer between a sending node 104 and a receiving node 102. Initially, the sending node 104 sends a message stating "I've got data" 402. In a preferred embodiment, the sending node uses the Message Passing Interface (MPI) standard, although any appropriate protocol or standard can be used.

Figure 4B:
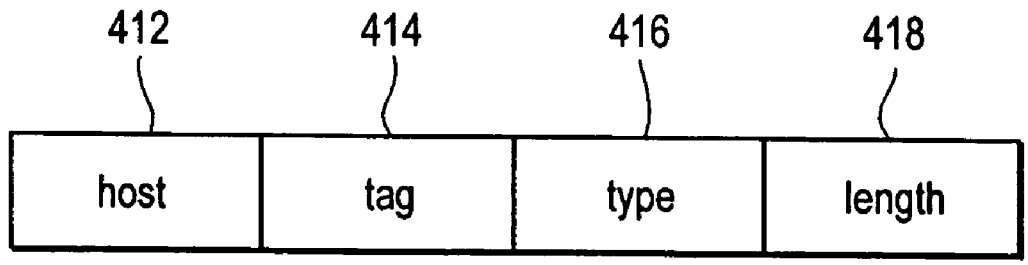
FIG. 4(b) shows an example of a partial protocol header received from a sending node of FIG. 4(a).

FIG. 4(b) shows an example of a partial protocol header in a packet 402 received from a sending node of FIG. 4(a). The header includes, but is not limited to the following fields, which can occur in any appropriate order:

host 412—identifier of the sending node/host that wants to send data
tag 414—identifier chosen by application
type 416—identifies this as a request to send data using TIDs
length 418—length of data to be sent Host 110 communicates a token identifier (TID) to I/O interface 112. A TID identifies a physical location in the host memory, but is not itself a memory address. Interface 112 sends a message stating "Send data to this TID" 404. In certain embodiments, the message to the sender also includes values for the Version, Port, and offset (see memory key 613 of FIG. 6). Certain embodiments also include flags 620.

Figure 4C:
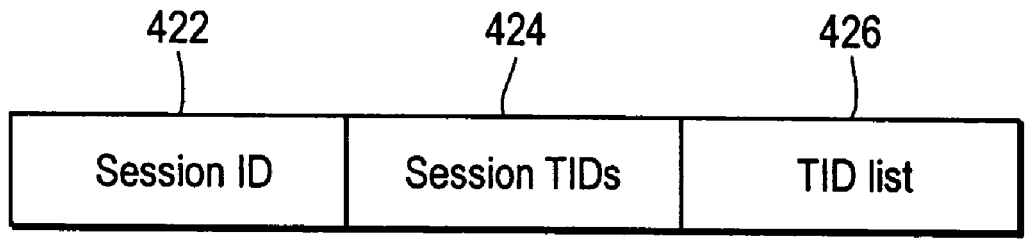
FIG. 4(c) shows an example of a partial protocol header sent to the sending node of FIG. 4(a).

FIG. 4(c) shows an example of a partial protocol header in a packet 404 received from the receiving node of FIG. 4(a). The header includes, but is not limited to, the following fields, which can occur in any appropriate order:

sessionID 422—identifies which transfer of one to many in progress
numTIDs 424—number of TID entries in this reply that can be used
TIDlist 426—list of triplets (numTIDs long).

Each triplet in the TIDlist includes 1) TID, 2) offset in TID buffer, 3) length of data to put in this TID buffer.

Thus, a long data transmission may require multiple triplet entries in the TIDlist if the protocol used has a limited message size.

Lastly, the sending node sends data packets 406 labeled with the respective TID(s) (or with the entire memory key) sent by the receiving node and the data is DMA'd to the host at the physical memory location identified by the TID(s) (or memory key). In a preferred embodiment, the sending node places the TID(s) (or the memory key) into the packet as shown in FIG. 6. In a preferred embodiment, the sending node breaks long data (e.g., data longer than 2 K) into multiple packets and updates the offset field 618 for each of the multiple packets.

One advantage of using a TID in the manner shown in FIG. 4(a) is enhanced security. The sending node only needs to know the identity of the requesting host, but the sending node does not know at what physical location in the host's memory the data will eventually be stored. In fact, the receiving node can change the physical memory addresses associated with a TID with no negative effects since the sending node only knows about the TID. Thus, TIDs are advantageous over both physical memory addresses and over virtual memory addresses because the sending node does not need to know an address at all.

In a preferred embodiment, the TID(s) to use for a particular data transmission is chosen via a least recently used (LRU) free list maintained on the host. The host takes the lesser of the required number, or the number currently available from that list. The list is usually hashed with addresses, so that entries can be reused if desired (to minimize overhead in converting virtual addresses to physical, and programming them in the device).

Figure 5A:
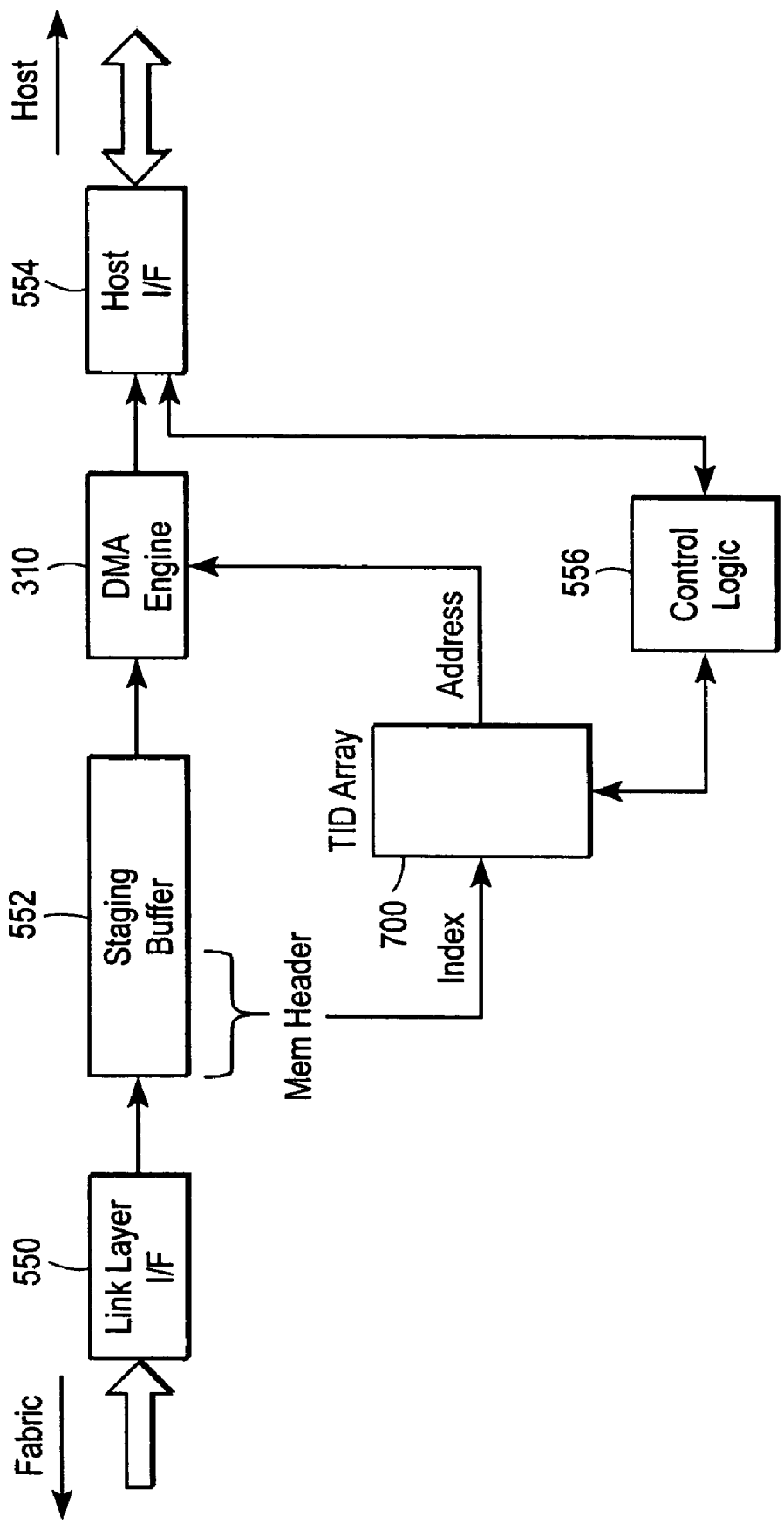
FIG. 5(a) is a block diagram showing a method used to receive a data packet in accordance with a preferred embodiment of the present invention.

FIG. 5(a) is a block diagram showing a method used to receive a data packet in accordance with a preferred embodiment of the present invention. When a packet is received from network 130 (such as a FibreChannel fabric), it passes through the link layer interface 550 and a first portion is temporarily stored in a staging buffer 552. It should be noted that only enough of the packet must be received at this point to perform validation and lookup before starting the cut-through DMA operation as described below. The staging buffer is also the buffer that is DMA'd to the receive header queue, after the payload is DMA'd.

Decode logic 304 (FIG. 3(a)) parses the packet and derives an index into TID array 700, which provides a physical address in the host that is used for a DMA transfer to the host 112 via host interface 554. Control logic 556 communicates with the host to maintain the TID array and to send relevant data to the host, as described below.

Figure 5B:
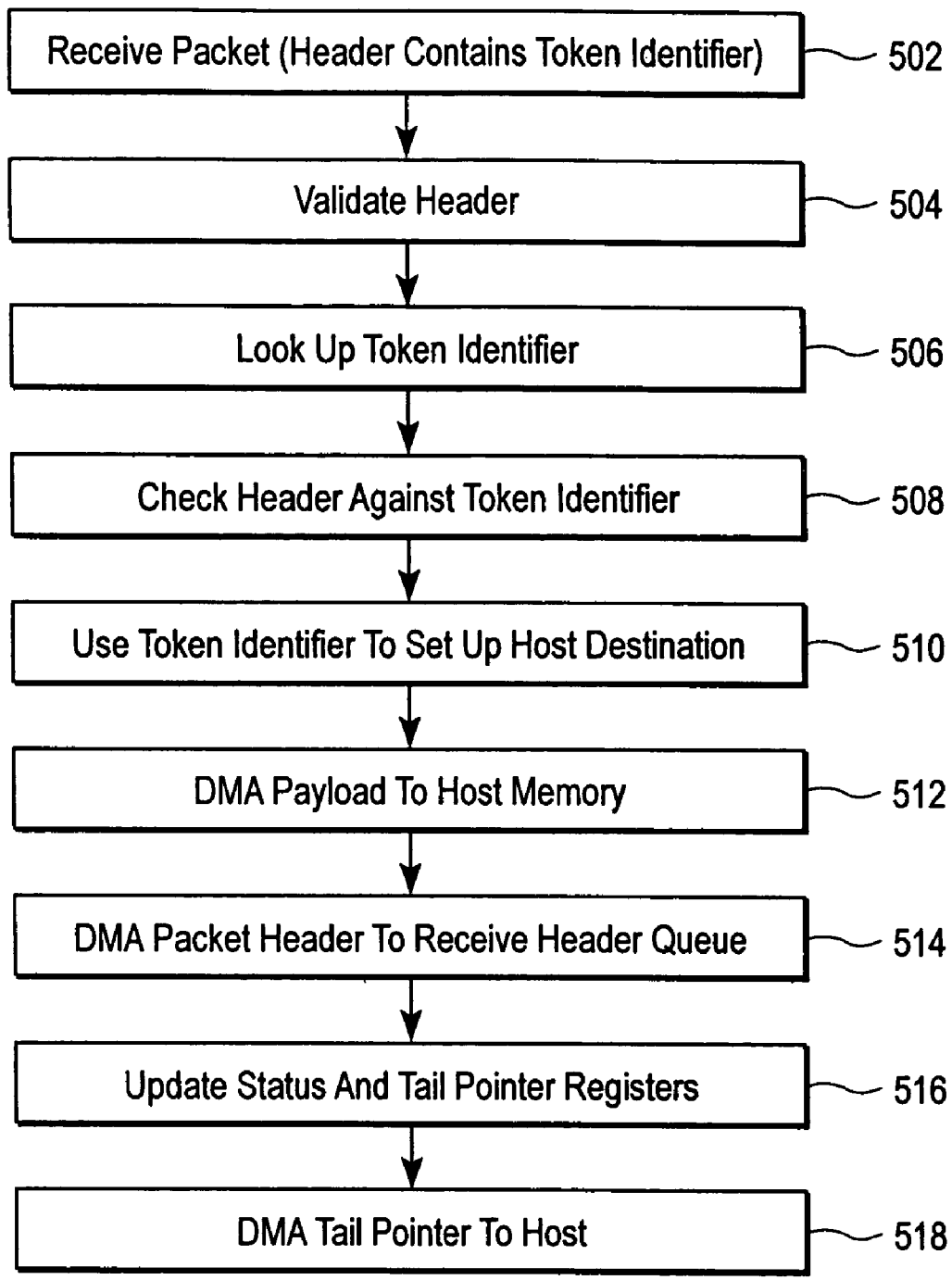
FIG. 5(b) is a flow chart showing details of method of FIG. 5(a).

FIG. 5(b) is a flow chart showing a method used to receive a data packet in accordance with a preferred embodiment of the present invention. The steps of FIG. 5(b) correspond to element 406 of FIG. 4(a). First, a packet is received 502. The packet contains a token identifier (TID) in its header. Each of the elements of FIG. 5(b) is discussed below.

FIG. 6 shows an example format for a received packet 600. In one embodiment, network 130 is an InfiniBand network, so packet 600 is based on an InfiniBand packet and contains a standard InfiniBand header 602. In other embodiments, the received packet may be of a different type. Header 602 includes a packet length (not shown), which is a standard part of the header 602.

Packet 600 includes a memory header 604, which is shown in detail in FIG. 6. The fields Version 612, Port 614, token identifier (TID) 616, and offset 618 are collectively known as "a memory key" for ease of discussion. The memory key will be used to determine a physical address in host memory where the packet will be copied. The memory header also includes pktflags 620 and a "cut-through checksum" 622, which is discussed below in connection with FIG. 11. Packet 600 also includes a protocol header 606, which is used by software on the host, and a payload 608, which contains the data to be written into host memory.

Version 612 is preferably a 4 bit version, describing a data format of memory header 604. The first version is preferably "1" and all zeroes is not used. This field only changes when the parts of the header parsed by the interface 112 change. Port 614 is preferably a 4 bit value and is checked to ensure that it is less than a known number of ports. Embodiments containing multiple ports in the host preferably will use this field.

Token identifier (TID) 616 is preferably 10 bits and is checked to ensure that it is either all ones (eager TID, discussed below) or less than a known TID value. Offset 618 is preferably a 14 bit word offset that is related to a particular implementation discussed below in connection with FIG. 10. Not all embodiments contain this field. PktFlags 620 is preferably 16 bits long. The only defined field that is checked by the interface is KPF_Intr. When this flag is set, the interface will assert an interrupt status flag when the packet has completed DMAing to memory. This flag is set by the sender when it is important that the receiver respond immediately.

Cut-through checksum 622 is preferably a 16 bit checksum field over the InfiniBand header 602 (which contains packet length) and the first two words of the memory header 604.

Protocol header 606 is not looked at by the interface of the described embodiment except to validate the cut-through checksum as described in connection with FIG. 11. Payload 608 contains data to be received.

Returning to FIG. 5(b), the header of the received packet is validated 504. As an example, the packet length (in the InfiniBand header 602) added to the Offset 618 must be less than a host buffer length or the data will be stored past the end of the host buffer, which is undesirable. Other examples of validation include but are not limited to generating a cut-through checksum (see FIG. 10) and comparing it with the cut-through checksum in the received packet; determining whether the received port value 614 represents a valid and enabled port; determining that the version number 612 is valid; and determining that the TID 616 is in a valid range.

In addition, validation preferably includes checking a Valid flag 702 in a Receive TID Array 700 to determine whether the Valid flag is set.

Figure 7:
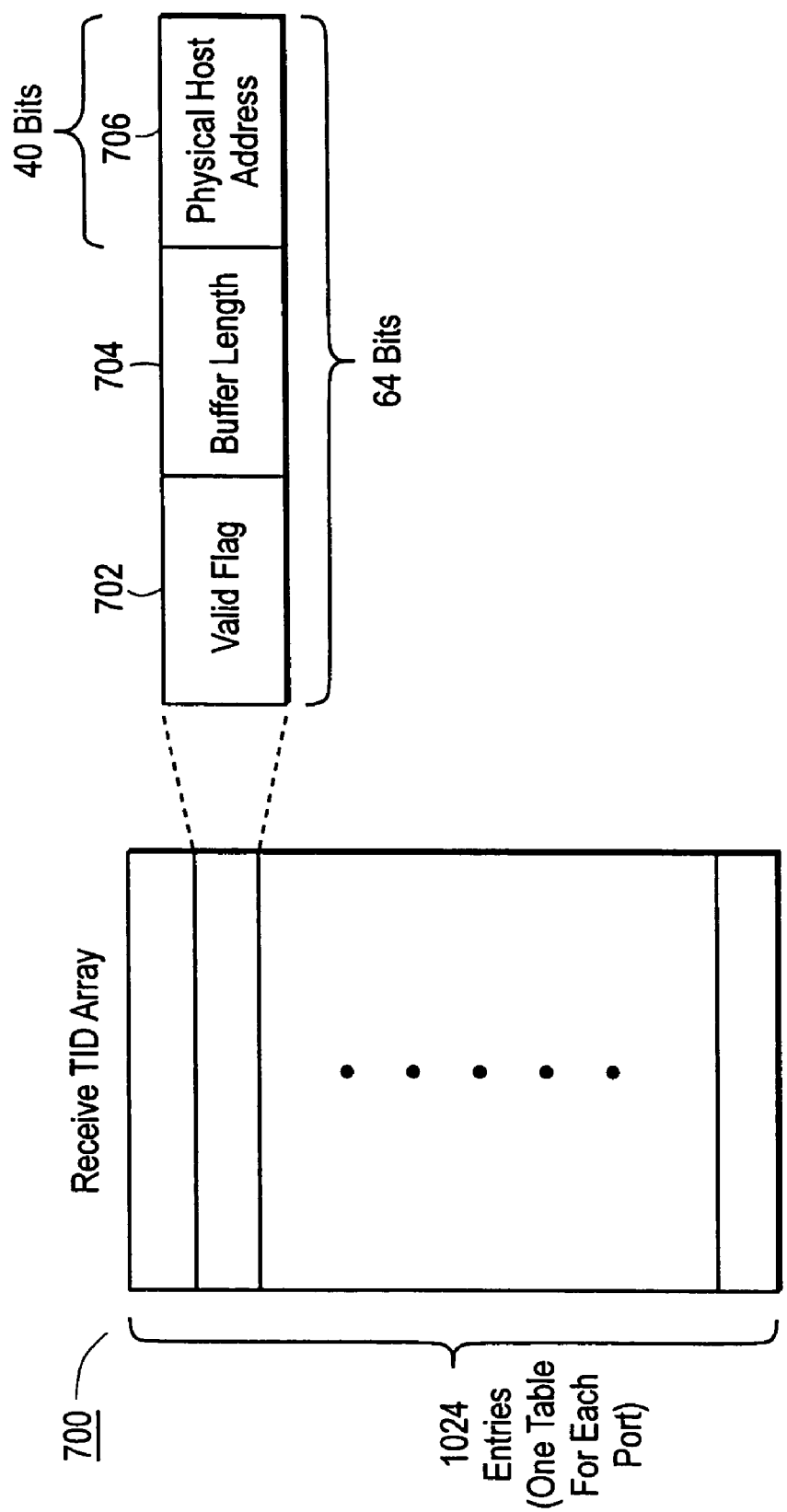
FIG. 7 shows an example format of a Received TID Array.

Returning to FIG. 5(b), the token identifier 616 is used as an index into a Receive TID Array 700 for the Port 614 as shown in FIG. 7. In a preferred embodiment, there is a Receive TID Array 700 for each Port as shown in FIG. 2.

FIG. 7 shows an example format of Receive TID Array 700. In the example, the Array has 1024 entries although an appropriate number can be used. Each entry contains a Valid flag 702, a Buffer Length 704, and a physical host address 706, indicating a location in the buffer of host 110 where the received data is to be stored. Thus, each TID identifies a location in the host's memory. The Valid Flag 702 indicates whether the entry contains valid information. In a preferred embodiment, the Valid flag is not cleared when a packet is processed, so while a clear Valid flag indicates an error, a set flag does not necessarily indicate lack of an error. The Valid flag is not cleared in the described embodiment because to do so would require a write operation from the host and because of the existence of a 2 K byte limit on the data payload that is inherent in InfiniBand. Because of this limitation of payload length, data is sometimes transferred in multiple packets that are associated with the same TID but that have different offset values (see FIG. 10). In this case, it would be incorrect to clear the TID after processing the first of the series of packets.

In a preferred embodiment, if the Valid flag 702 is not set, a received packet will have only its header parts written to the Receive Header Queue 800. In this case, the part of the packet following the words written to the Receive Header Queue 800 will not be written anywhere in host memory and are lost.

Buffer Length 704 is the size in words of the host buffer pointed to by physical host address 706. Physical host address 706 preferably is at least a 40 bit address of the buffer in host memory. The described embodiment supports up to a 48 bit address (although the invention is not thus limited). A current Opteron implementation only supports a maximum of 40 physical addresses, although future versions may support larger address sizes.

As shown in FIG. 5(b), the header is checked against the token identifier 508 and the token identifier is used to set up a host destination 510. The received data (i.e., payload 608) is sent to the host memory via Direct Memory Access (DMA) 512. Then header information is DMA'd to a Receive Header Queue 800.

Figure 8:
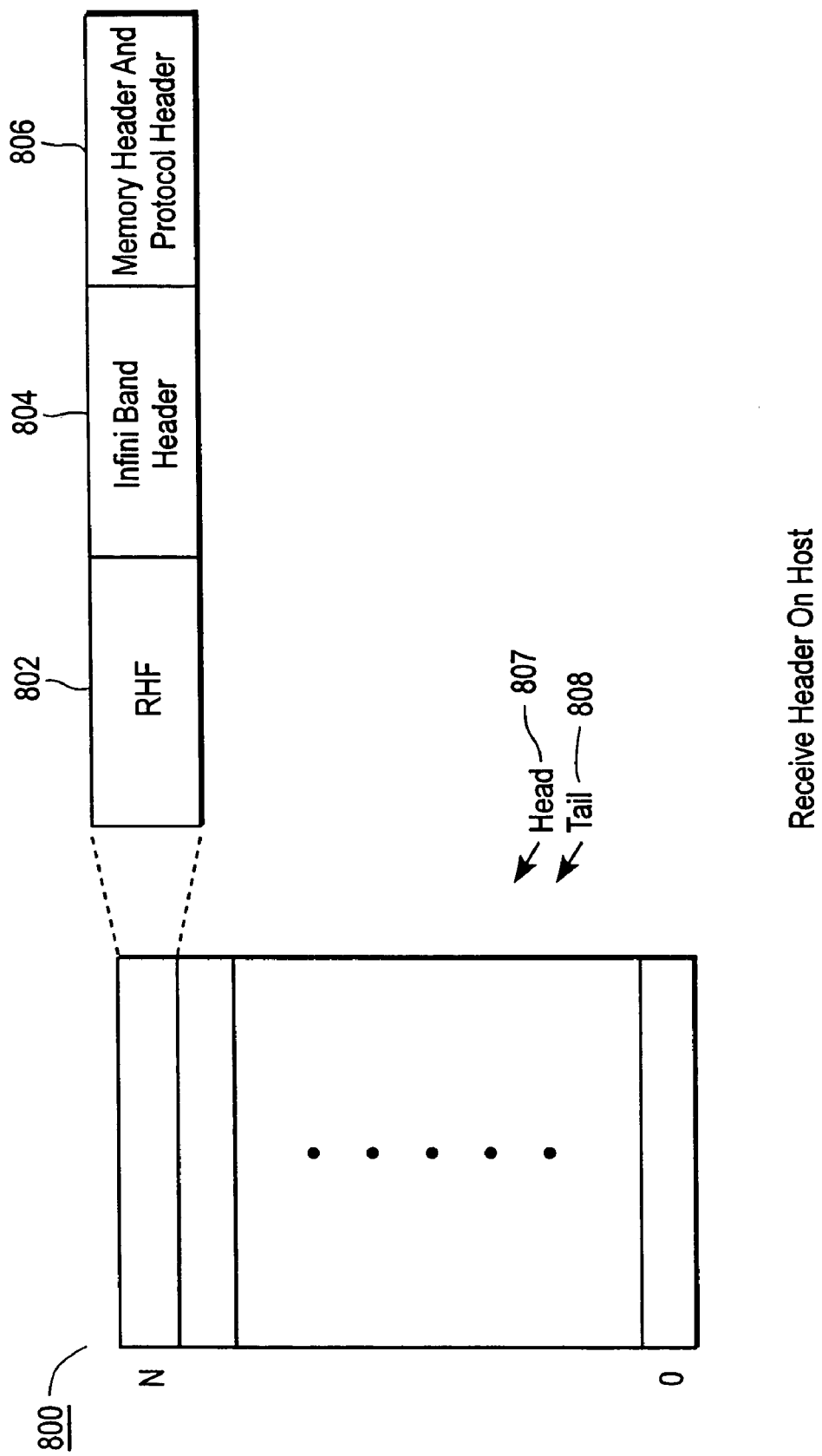
FIG. 8 shows an example format of a Receive Header Queue.

FIG. 8 shows a Receive Header Queue 800. Each application on the host has its own Receive Header Queue 800. Each Receive Header Queue 800 preferably is located in physically continuous memory. Each entry contains Receive Header Flags 802; the InfiniBand header 602/804; and memory header 604/806, which also includes the protocol header 606 from the received packet. Examples of Receive Header Flags 802 are shown in Table 1. These flags preferably are written by the interface after the rest of the entry is written but always before the Receive Header Tail 808 pointer is updated. It is necessary to wait until the entire packet has been received because some flags, such as the EGP (good packet flag) cannot be set until the entire packet is received.

Next, as shown in FIG. 5(b), the status flags are updated and Receive Header Tail pointer 808 in the interface is updated 516 to indicate that there is a new entry in the Receive Header Queue. Next, the Receive Header Tail pointer 808 in the host is updated. In a preferred embodiment, the host determines that new data is available by polling the Tail pointer 808 for the Receive Header Queue. Thus, while in a preferred embodiment, an application on the host side sets the Receive Head pointer 807 on the host, the interface 112 sets the Receive Tail pointer 808 on the host.

Figure 9:
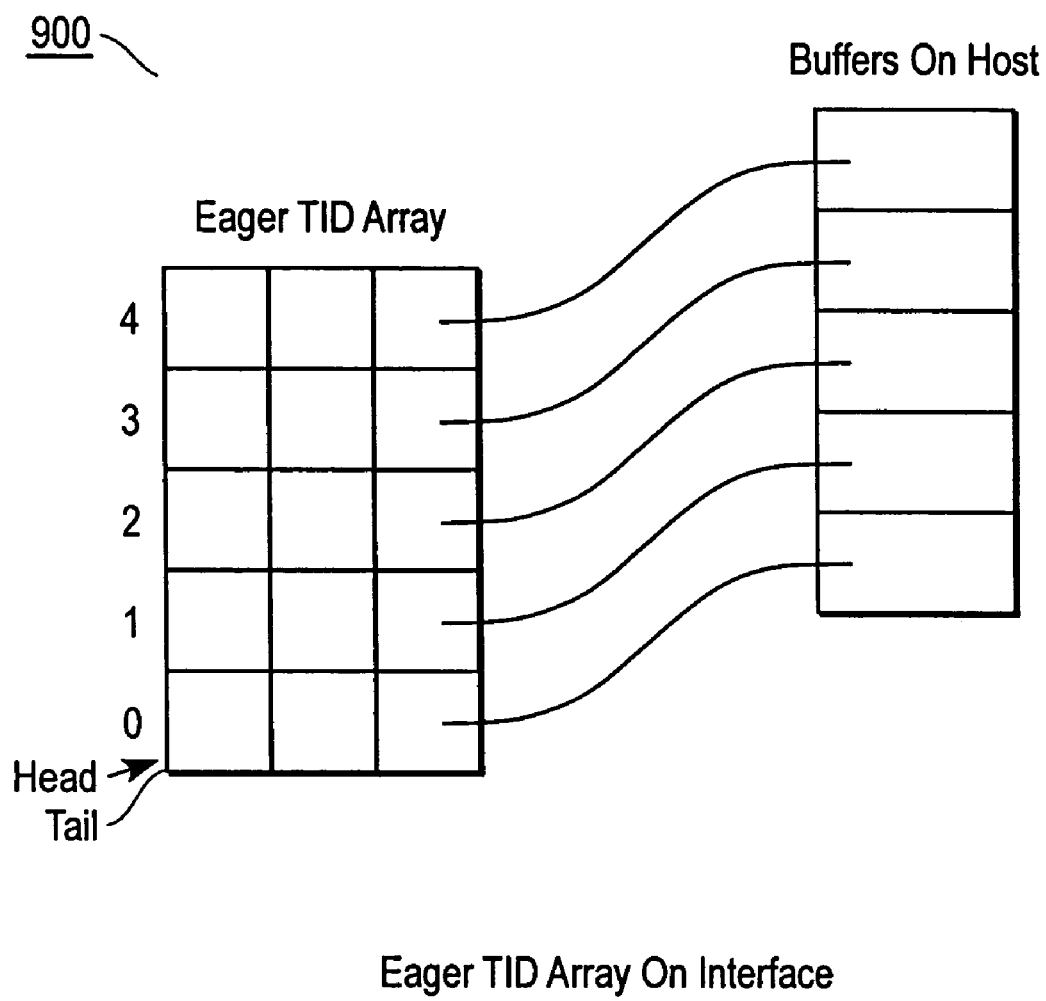
FIG. 9 shows an example format of an Eager TID Array.

FIG. 9 shows an Eager TID Array 900, which is used in some embodiments of the present invention. Eager TIDs are used for "unexpected" packets, such as a control message, a synchronization message, or a short message sent by a sender node without going through the protocol shown in FIG. 4(a). An Eager TID is indicated by a TID field in the packet having a value of all "1"s. Because the packet is "unexpected," interface 112 has not sent a TID to be used for the packet. In the described embodiment, short packets do not need to use unexpected/eager mode, but for performance reasons, usually do. Whether a packet is "unexpected" is the most important issue, rather than the length. Also "short" in this context may well mean a user protocol payload of more than one InfiniBand (2

KB) packet. It's a question of the crossover point in copying data, versus overhead involved in setting up the expected TID transfer.

In a preferred embodiment, there is an Eager TID Array 900 for each Port as shown in FIG. 2. Each Eager TID Array 900 preferably contains 512 entries. The Eager TID Array acts as a DMA list in a similar manner to the Received TID Array. In a preferred embodiment, TID entries in the Eager TID Array are used only once and are allocated in a circular fashion.

Figure 10:
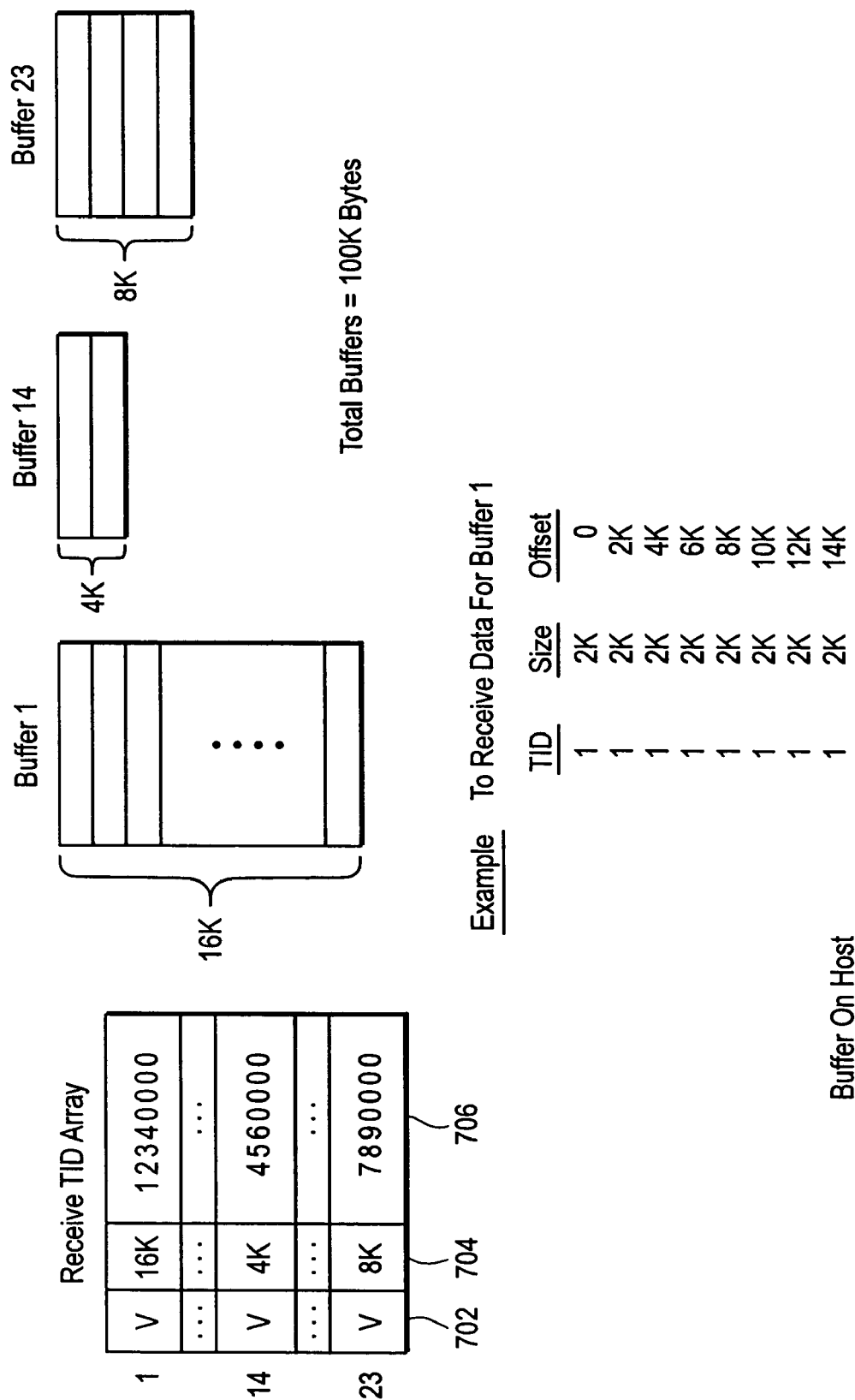
FIG. 10 shows an example format of a buffer in accordance with the present invention.

FIG. 10 shows an example of how sending node might break data into a series of packets. This may occur, for example, if the data length exceeds the predetermined payload length of a packet. FIG. 10 shows an example Receive TID Array 1002. In the example, a TID 1 is associated with a 16 K buffer at location 12340000. A TID 14 is associated with a 4 K buffer at location 4560000. A TID 23 is associated with an 8 K buffer at location 7890000. When data is sent from the sending node for TID 1, it is broken into eight 2 K packets. The offset in each of these packets is progressively larger, indicating that the received data is to be stored at the memory address identified by TID 1 and offset by the offset value in the corresponding packet. Thus, in the described embodiment, the sending node must be aware of the existence of the memory header field 604 and must take appropriate actions to put the proper values in the field 604.

Figure 11:
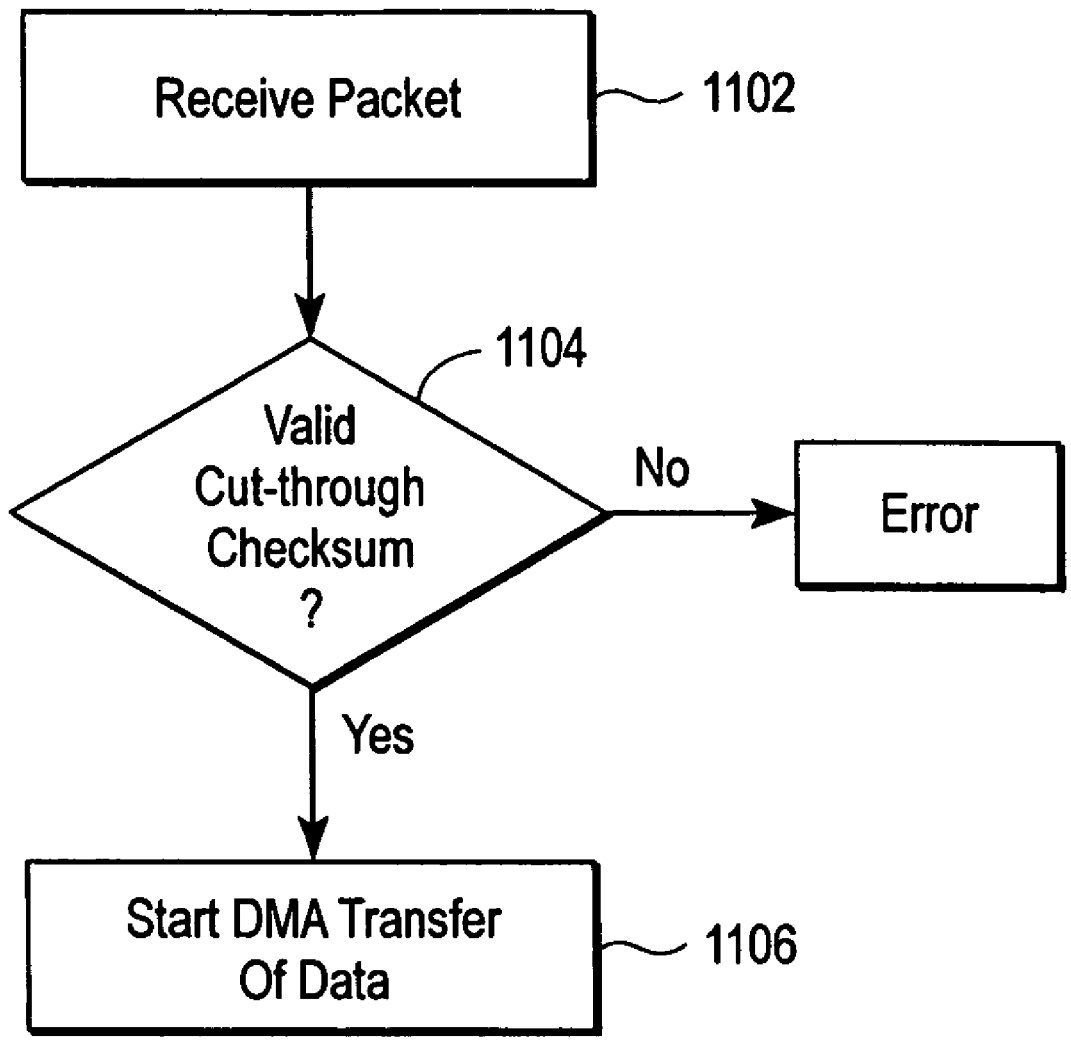
FIG. 11 is a flowchart showing a method of processing a checksum in a packet before the entire packet is received.

FIG. 11 is a flowchart showing a method of processing a checksum in a packet before the entire packet is received. As shown in FIG. 6, a received packet 600 includes a cut-through checksum 622. This cut-through checksum 600 is based on certain fields in the header of the received packet, but is not based on the payload data in the packet. The exact fields used to compute a cut-through checksum will vary with implementation. In a preferred embodiment where the packet 600 is an extension of an InfiniBand header (see FIG. 6), the following checks are made before beginning a DMA transfer. The DMA transfer is begun before the entire packet is received, thus decreasing latency. Because a certain amount of checking is performed in connection with the cut-through checksum, it is reasonable to make a tradeoff between increasing latency and making sure that the data being written is accurate before the DMA begins.

In a preferred embodiment, the cut-through checksum (also called a K_Checksum) is sixteen bits although other lengths can be used. The cut-through checksum is preferably computed as follows:

Cut-through Checksum=A+B+C,
or Cut-through Checksum=A+B−C
or Cut-through Checksum=A−B−C−1.

Other appropriate functions f for computing a Cut-through Checksum can be used. Use of a cut-through checksum determines that enough of a packet has been validated to guarantee that the memory location to which the data transfer is directed (in cut-through fashion) in host memory, is the correct and safe memory location for the packet. To put this another way, if the checksum had not been validated, the packet might have indicated (erroneously) that the data transfer should have been directed to a location in the host memory that was a location reserved for some other packet (overwriting the data of that packet if allowed to continue).

Where A is a LNH (This is preferably a 2 bit field. B is the PktLen field from the InfiniBand header and is preferably an 11 bit field. Link Next Header) field in a LRH (Local Routing Header) in InfiniBand header 602. In one implementation, the bytes in the InfiniBand header are swapped before the checksum is computed. C is formed from a portion of the memory header 604. This preferably includes Version 612, Port 614, TID, 616, Offset 618 and PktFlags 620. Checking these values before beginning the DMA protects all fields that are needed to start transferring data to host memory before the InfiniBand CRC checksum results are known and also validate that the received packet is of the proper type.

It will be understood that various implementations will compute the cut-through checksum differently. For example, an implementation that does not include TIDs will not include a TID value in the checksum. For example, an implementation that does not include offsets will not include an offset in the checksum, and so on. A cut-through checksum is any checksum that is computed using header based data only in order to decrease latency and speed up data transfer.

As will be understood by those familiar with the art, the invention may be embodied in other specific forms without departing from the spirit or essential characteristics thereof. Likewise, the particular naming and division of the modules, features, attributes, methodologies and other aspects are not mandatory or significant, and the mechanisms that implement the invention or its features may have different names, divisions and/or formats. Furthermore, as will be apparent to one of ordinary skill in the relevant art, the modules, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for receiving a packet, comprising:
a packet source sending a message to a host, the message indicating that the packet source has a data packet ready for transfer to the host, the host having a memory;
the host sending a message to the packet source, the message including a token identifier;
the host receiving the data packet from the packet source, the received packet having a header, a memory header including at least the token identifier, and a payload; and
the host writing at least some of the payload to a memory location identified by the token identifier;
wherein the message sent by the packet source to the host includes a field that indentifies the message as a request to send data using token identifiers;
wherein the message sent by the host to the packet source includes a header having a first field that identifies a communication session between the packet source and the host, a second field that identifies a number of token identifiers that the packet source is permitted to use for transferring a data packet, and a third field identifying a list of triplets;
wherein each triplet in the list of triplets includes a token identifier, an offset in a token identifier buffer, and a length of data to put into the token identifier buffer; and
wherein each token identifier identifies a physical location in the host memory, but is not itself a memory address and is not itself a virtual memory address.

2. The method of claim 1, wherein the packet further comprises a version number identifying a version of the packet format.

3. The method of claim 1, wherein the packet further comprises a port number identifying a port on the host capable of communicating with an interface to the host.

4. The method of claim 1, wherein the packet further comprises an offset into a memory of the host.

5. The method of claim 1, wherein the packet further comprises a cut-through checksum field determined in accordance with the packet header and at least the token identifier and capable of being checked before all of the packet is received.

6. The method of claim 1, wherein the packet further comprises a status flag indicating that an interface to the host should assert an interrupt status flag when the packet has completed DMAing to memory.

7. The method of claim 1, wherein the packet is sent in accordance with an InfiniBand protocol.

8. The method of claim 1, wherein writing at least some of the payload comprises writing the entire payload to the memory location identified by the token identifier.

9. The method of claim 1, wherein the packet source is a sending node.

10. The method of claim 1, wherein the packet source is a sending node on a FibreChannel network.

11. The method of claim 1, wherein the host is a receiving node on an InfiniBand network.

12. The method of claim 1, wherein the steps are performed by an interface device connected to the host system and wherein the memory location in which the payload is written is located on the host system.

13. The method of claim 1, wherein the message sent by the packet source is a packet having a header including a host ID.

14. The method of claim 1, wherein the message sent by the packet source is a packet having a header including data that is chosen by the packet source.

15. The method of claim 1, wherein writing at least some of the payload comprises writing the entire payload to the memory location identified by the token identifier and an offset.

16. The method of claim 1, wherein the token identifier is an integer used for a table lookup.

17. The method of claim 1, wherein the token identifier is an ASCII value.

18. The method of claim 16, wherein the table is in memory.

19. The method of claim 16, wherein the table is in a receiving interface.

20. The method of claim 1, wherein the token identifier is used by the host to look up the memory address to which the data payload of a packet is copied via DMA.

21. A system for receiving a packet, comprising:
a packet source; and
a host having a memory;
wherein the packet source is configured to sent a message to the host, the message indicating that the packet source has a data packet ready for transfer to the host;
wherein the host is configured to sent a message to the packet source, the message including a token identifier, the host further configured to receive the data packet from the packet source, the received packet having a header, a memory header including at least the token identifier, and a payload, the host further configured to write at least some of the payload to a memory location identified by the token identifier;
wherein the message sent by the packet source to the host includes a field that identifies the message as a request to send data using token identifiers;
wherein the message sent by the host to the packet source includes a header having a first field that identifies a communication session between the packet source and the host, a second field that identifies a number of token identifiers that the packet source is permitted to use for transferring a data packet, and a third field identifying a list of triplets;
wherein each triplet in the list of triplets includes a token identifier, an offset in a token identifier buffer, and a length of data to put into the token identifier buffer; and
wherein each token identifier identifies a physical location in the host memory, but is not itself a memory address and is not itself a virtual memory address.

22. The system of claim 21, wherein the packet source does not know the memory location identified by the token identifier.

23. The method of claim 1, wherein the packet source does not know the memory location identified by the token identifier.

24. The method of claim 1, further comprising the host changing a physical memory address associated with the token identifier after sending the token identifier to the packet source but before the host writes at least some of the payload to a memory location identified by the token identifier.

* * * * *

UNITED STATES PATENT AND TRADEMARK OFFICE
CERTIFICATE OF CORRECTION

PATENT NO.        : 7,561,567 B1                                    Page 1 of 1
APPLICATION NO.   : 11/137925
DATED             : July 14, 2009
INVENTOR(S)       : Dave Olson et al.

It is certified that error appears in the above-identified patent and that said Letters Patent is hereby corrected as shown below:

In column 8, line 53, in claim 1, delete "indentifies" and insert -- identifies --, therefor.

In column 10, line 9, in claim 21, delete "sent" and insert -- send --, therefor.

In column 10, line 12, in claim 21, delete "sent" and insert -- send --, therefor.

Signed and Sealed this

Nineteenth Day of October, 2010

David J. Kappos
*Director of the United States Patent and Trademark Office*